C. FORBES.
APPARATUS FOR DEMONSTRATING AND ILLUSTRATING WAVE MOTIONS.
APPLICATION FILED MAY 17, 1905.

903,074.

Patented Nov. 3, 1908.

2 SHEETS—SHEET 1.

WITNESSES
L. H. Schmidt.
Amos W Hart

INVENTOR
CHARLES FORBES,
BY Munn & Co.
ATTORNEYS.

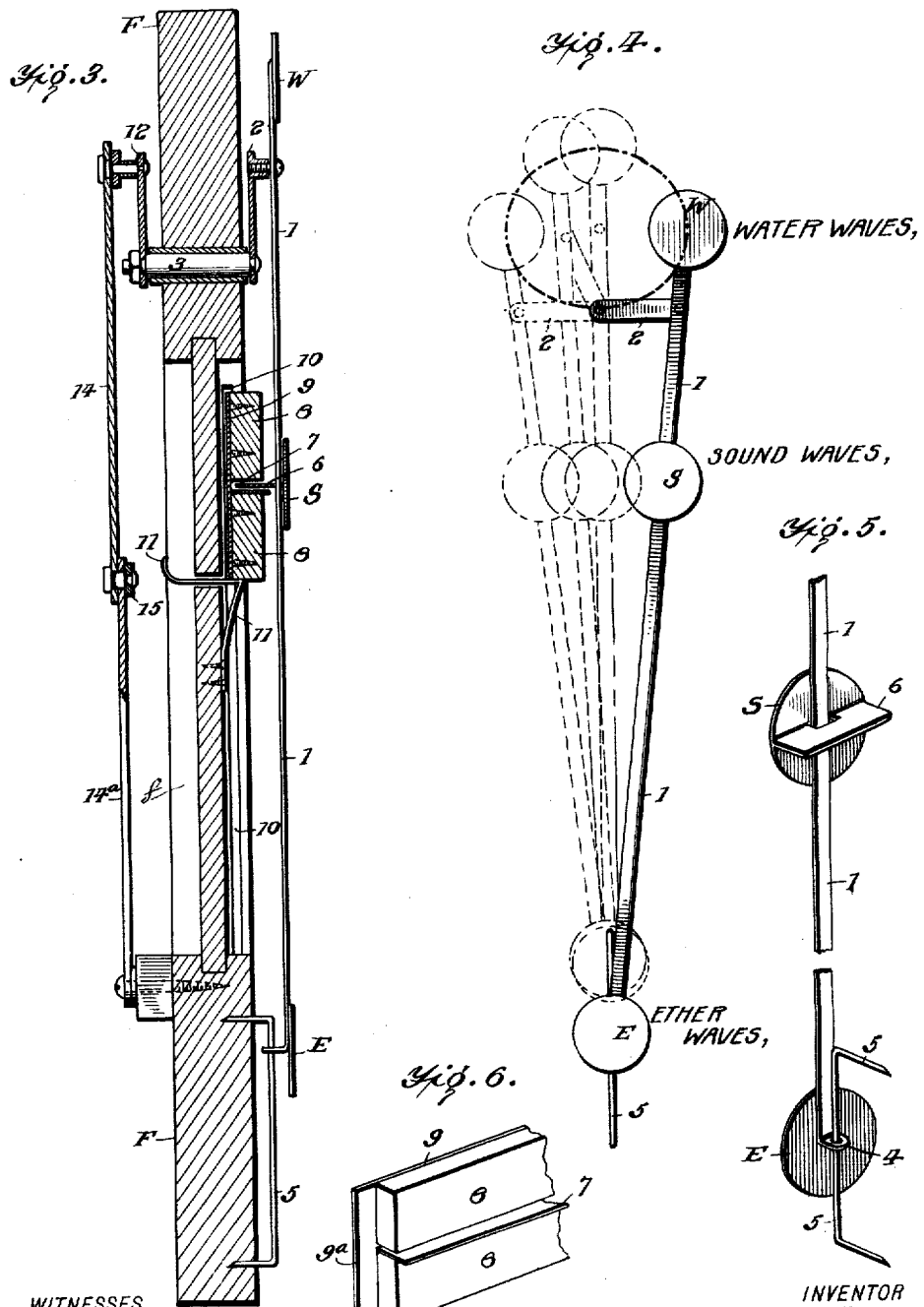

UNITED STATES PATENT OFFICE.

CHARLES FORBES, OF NEW YORK, N. Y.

APPARATUS FOR DEMONSTRATING AND ILLUSTRATING WAVE MOTIONS.

No. 903,074.

Specification of Letters Patent.

Patented Nov. 3, 1908.

Application filed May 17, 1905. Serial No. 260,913.

*To all whom it may concern:*

Be it known that I, CHARLES FORBES, a citizen of the United States, residing at New York city, in the county of New York and the State of New York, have invented an Improvement in Apparatus for Demonstrating and Illustrating Wave Motions, of which the following is a specification.

Figure 1:
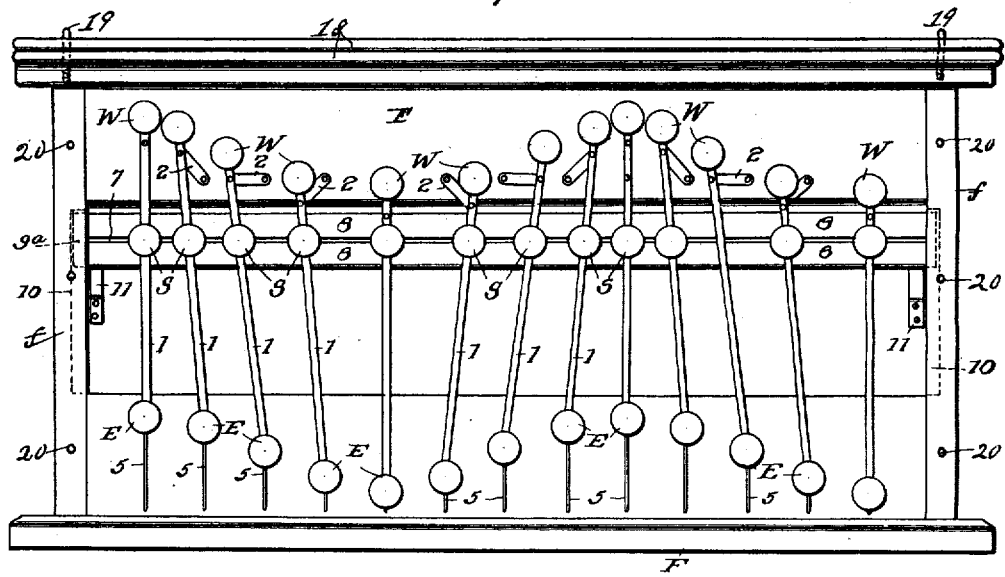

My invention is an apparatus for demonstration of the formation and propagation of water or surface waves, waves of condensation and rarefaction, as sound waves, and transverse waves, as the ether waves of light, heat, and electricity. The construction and operation of the apparatus are as hereinafter described, and illustrated in the accompanying drawings in which Figure 1 is a face or front view, and Fig. 2 a back or rear view, of the apparatus. Fig. 3 is an enlarged vertical section of the apparatus. Fig. 4 is mainly a diagrammatic view illustrating the movement or operation of the parts which illustrate the three general classes of wave motion before referred to. Figs. 5 and 6 are perspective views illustrating the certain details of the apparatus.

The principal feature of my apparatus (see Figs. 1 and 4) is a series of wave-motion indicators, constructed, in this instance, in the form of metal disks, those marked W for undulating surface or water waves, S for radial sound or air waves, and E for transverse or ether waves. These disks are connected with a bar or rod 1 to which such movement is imparted as required to cause the upper disks W to describe an ellipse, the middle disks S to move horizontally in a straight line, and the lower disks E to reciprocate vertically.

Figure 2:
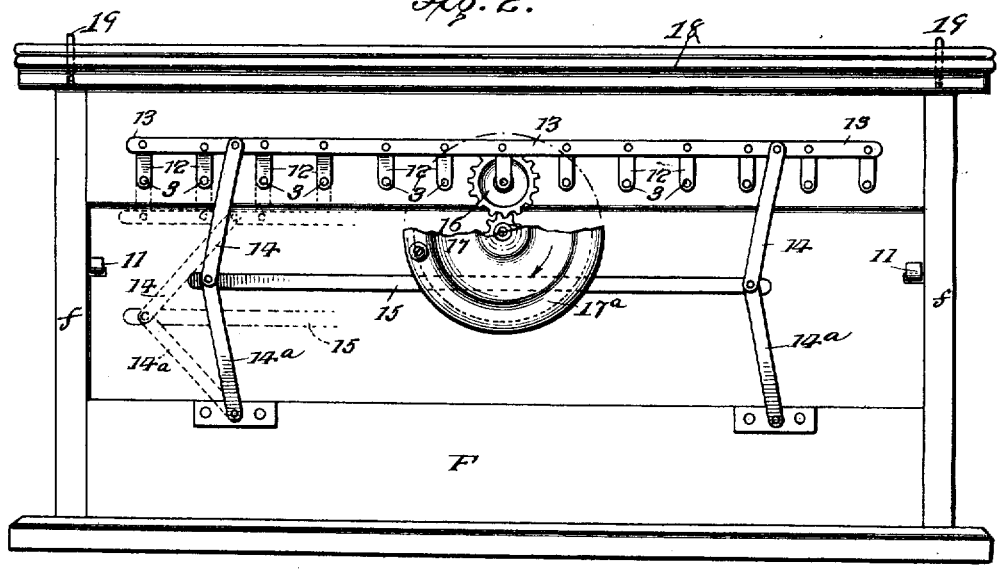

As shown in Fig. 1, a series of rods 1 and their connected disks is arranged on a vertical supporting frame F, to which rods the required movement is imparted by cranks and the mechanism arranged chiefly on the back of the said frame, as shown in Figs. 2 and 3.

The upper end of each rod 1 is pivoted to a crank 2, which is in turn fixed on a rotatable shaft 3 that passes transversely through the upper portion of the frame or support F. The lower end of each rod 1 is provided with a loop 4, as shown in Figs. 3 and 5, and is thus connected with, and adapted to slide on, a vertical guide 5, formed of a stout wire whose ends are bent at right angles and parallel to each other, so that they may be inserted in the base portion of the frame. The upper disks W, and the lower disks E are fixed on the rods 1, and the middle disks are loosely connected therewith, the same being provided on the back, as shown in Figs. 3 and 5, with a horizontal flange 6 having an opening through which the rod slides. This flange 6 projects into a groove 7 (see Figs. 3 and 6) which is formed by spacing apart of two wooden bars 8 that are screwed to a metal back plate 9.

It will now be apparent that if rotation be imparted to the short shafts 3, the rods 1 will be operated to change the position of the disks as indicated diagrammatically in Fig. 4; that is to say, the upper disks W will describe an ellipse, the middle disks S will move horizontally, and the lower disks E will reciprocate vertically. In this manner, the undulatory movement of water waves will be illustrated by the upper disks, the radial movement of sound waves, which are propagated in the form of concentric spheres, will be illustrated by the disks S, and the transverse vibration of ether waves by the disks E. In this instance, I have represented thirteen rods 1 with corresponding sets of disks, in Fig. 1, and all the cranks 2 connected therewith are arranged at 45° to one another. This number of rods and disks serves to form one and one-half complete wave to each set as represented by the several disks W, S, E. The number need not be limited to thirteen, but when this number is employed, the cranks 2 must be arranged at the angle specified.

It is apparent that by the operation of all the rods and disks simultaneously, the formation of the three general classes of wave motion are illustrated simultaneously, the elliptical motion indicating the advance of a water crest tending to form breakers, and the recession of the trough tending to form the undertow; the disks S, also approach and recede from each other to indicate waves of condensation and rarefaction, while the transverse vibration of the disks E indicates transverse vibration representing the production of light, heat, and electric waves. The same disks may also be used to indicate the progressive undulations of an undulating cord.

It will be further noted that the apparatus admits of a ready comparison of similar phases in the three kinds, or systems, of wave motion.

A change in the amplitude of vibration of sound waves may be indicated by lowering the support 8—9 by which the disks are guided. To this end, I extend the metal backing 9 of the guide 8, as indicated in Fig. 6, and such projecting part 9ª enters vertical grooves 10 (see Figs. 1 and 2) which are formed in the end bars or posts of the frame F.

In the position shown in Figs. 1 and 3, the support 8—9 rests upon spring-catches 11, whose free ends project back through slots in the frame. It is obvious that by drawing back the catches 11, the support 8—9 may be lowered so as to rest on the lower, or base, portion of the frame, and this will obviously result in limiting the to-and-fro movement of the disks S, or, in other words, cause them to indicate a less amplitude of vibration.

It will also be seen that if the distant end of the support 8—9 be lowered below the other, there will be a decrease in the amplitude of vibration, and consequently in the loudness of sound. It will be further seen that the phases of the three sets of waves are coincident throughout, for example, the condensation of the sound waves follows, or coincides with, the crest of the water and ether waves.

Any one or two of the three rows of disks may be covered so that the third row or set may be observed alone. For this purpose I employ covers, or boards, 18; see Figs. 1 and 2. When not in use, the same are supported on the top of the frame by means of screw pins 19 that pass through holes formed in the boards or covers. When it is desired to use one or both of the covers, they are supported upon pins 20 that project horizontally from the front sides of the posts f. Thus one cover may be applied over the disks E constituting the lower row or set, and another over the middle row or set S, in which case the upper row or set, indicated by W, would be alone visible.

It remains to describe the mechanism on the back of the frame, as indicated in Fig. 3, by which simultaneous movement is imparted to all the shafts 3, as before described. The rear ends of the shafts 3 are provided with fixed cranks 12 all of which are parallel and connected with a horizontal bar 13, which is always held parallel to itself while rotating a crank. To secure this parallelism, I employ what might be called a double parallel-rule mechanism, the same consisting of two sets of bars 14, 14ª, and a connecting bar 15. The bars 14 are pivoted to the bar 13 near its ends and their lower ends are pivoted to the bars 14ª and connected by the bar 15. The bars 14ª are pivoted at their lower ends to the frame F. A gear 16 is mounted on the shaft 3 of one of the cranks, a pinion 17 engages the gear 16 and a grooved pulley 17ª is attached to the shaft of the pinion and provided with a handle by which it may be used as a crank for rotating the pinion and thereby the gear 16. The groove in the pulley (indicated by a dotted line) permits the application of an endless band extended to any suitable motor.

It will now be apparent that, by rotating the crank 18, all the cranks 12 will be rotated together, and thereby like rotation will be imparted to all the shafts E of the several rods 1, with the result of shifting the position of the disks W, S, E, as before described. It is possible to produce this operation without the use of the gear 16 and the pendant and crank connected therewith, by taking hold of the bar 13 with the thumb and finger and swinging it on the pivots 3.

What I do claim as my invention, and desire to secure by Letters Patent, is—

1. A wave motion apparatus having a mechanism producing three forms of wave motions, with coincident phases.

2. In a wave motion apparatus, having a mechanism producing three forms of wave motions; wave-representing disks in combination with a contrasting supporting background and an inclosing framework.

3. In a wave motion apparatus having a mechanism producing three forms of wave motions; wave-representing disks in combination with vertical controlling connecting rods.

4. In a wave-motion apparatus, the combination with a supporting frame, of a series of rods adapted for vertical and swinging movement and indicators attached thereto, and means connected with the rods at a point below their upper end whereby the indicators are caused to describe ellipses.

5. In a wave-motion apparatus, the combination with a supporting frame having a horizontal guide, of a series of indicators, and means for imparting a to-and-fro movement to said indicators for representing the propagation of sound waves.

6. In a wave-motion apparatus, the combination with a frame having a horizontal guide, of indicators for sound waves and means for imparting to-and-fro movement thereto, the said guide being adjustable vertically corresponding to a desired indication of change in amplitude of vibration of sound waves.

7. In a wave-motion apparatus, the combination with a supporting frame having a horizontal guideway, of a series of disks having projections working in such guideways, a vertical rod which is slidable in such disks, its lower ends being slidable vertically and disks attached to both its upper and lower ends, and means connected with the upper portion of said rod for imparting the desired differential movements of the disks.

8. In a wave-motion apparatus, the combination with a supporting frame, of a horizontal guide which is movable vertically on said frame, retractable spring catches which support the guide in elevated position, disks having parts that are slidable in the said guide, and means for imparting to-and-fro movement to the disks.

9. In a wave-motion apparatus, the combination with a supporting frame having vertical guides, of rods whose lower ends are slidable on such guides and provided with indicators, and means for reciprocating said rods whereby the indicators are moved to illustrate transverse or ether waves.

10. In a wave-motion apparatus, the combination with a supporting frame, of vertical rods, and disks connected therewith for illustrating wave motion, of cranks on which the rods are hung, transverse shafts carrying such cranks, other cranks fixed on the opposite ends of said shafts and arranged on the rear side of the frame, and means for connecting and holding the rear cranks parallel.

11. In a wave-motion apparatus, the combination, with a supporting frame, of vertical rods and disks connected therewith, cranks on which the rods are hung, transverse shafts to which the cranks are attached, other cranks 12 fixed on the opposite or rear ends of said shafts, and a bar 13 connecting such cranks and holding them parallel, and the parallel-rule mechanism consisting of two sets of bars 14, 14ª, and a bar 15 connecting the meeting ends of such bars, arranged and operating as described.

12. In a wave-motion apparatus, the combination with a supporting frame, of a series of vertical rods whose lower ends are guided vertically, disks attached to the upper ends of said rods, cranks pivotally connected with the rods at points below said disks and arranged in succession at an angle of 45° to each other, and means for rotating said cranks, whereby the elliptical movement of water-waves and formation of a crest and recession is illustrated.

13. A wave-motion apparatus comprising a vertical frame having uprights provided with forwardly projecting pins 20, a series of vertical rods and sets of disks attached thereto in transverse rows, and covers consisting of boards provided with holes corresponding in location to the distance between the pins of the uprights whereby they are adapted to be hung thereon for concealing a row of disks so that another row may be observed without confusion, as shown and described.

In testimony whereof, I have signed my name to this specification in the presence of two subscribing witnesses, this 11th day of May 1905.

CHARLES FORBES.

Witnesses:
CHARLES C. TROWBRIDGE, [L. S.]
ALLEN H. NELSON. [L. S.]